United States Patent [19]

Wood et al.

[11] Patent Number: 4,551,155

[45] Date of Patent: Nov. 5, 1985

[54] IN SITU FORMATION OF COAL GASIFICATION CATALYSTS FROM LOW COST ALKALI METAL SALTS

[75] Inventors: Bernard J. Wood, Santa Clara; Robert D. Brittain, Cupertino; Kenneth M. Sancier, Menlo Park, all of Calif.

[73] Assignee: SRI International, Menlo Park, Calif.

[21] Appl. No.: 511,767

[22] Filed: Jul. 7, 1983

[51] Int. Cl.$^4$ ............................................. C10J 3/06
[52] U.S. Cl. .................................. 48/197 R; 44/1 R; 48/202; 48/210; 502/184
[58] Field of Search ...................... 48/197 R, 202, 206, 48/210; 44/1 R; 502/184

[56] References Cited

U.S. PATENT DOCUMENTS 4,077,178 3/1978 Nahas et al. .......................... 48/202
4,094,650 6/1978 Koh et al. .......................... 48/197 R
4,204,843 5/1980 Neavel ................................. 48/202

FOREIGN PATENT DOCUMENTS 3133670 3/1983 Fed. Rep. of Germany ........ 48/202
48009 9/1980 Japan .................................... 48/202

Primary Examiner—Peter Kratz
Attorney, Agent, or Firm—John P. Taylor

[57] ABSTRACT

A carbonaceous material, such as crushed coal, is admixed or impregnated with an inexpensive alkali metal compound, such as sodium chloride, and then pretreated with a stream containing steam at a temperature of 350° to 650° C. to enhance the catalytic activity of the mixture in a subsequent gasification of the mixture. The treatment may result in the transformation of the alkali metal compound into another, more catalytically active, form.

15 Claims, 1 Drawing Figure

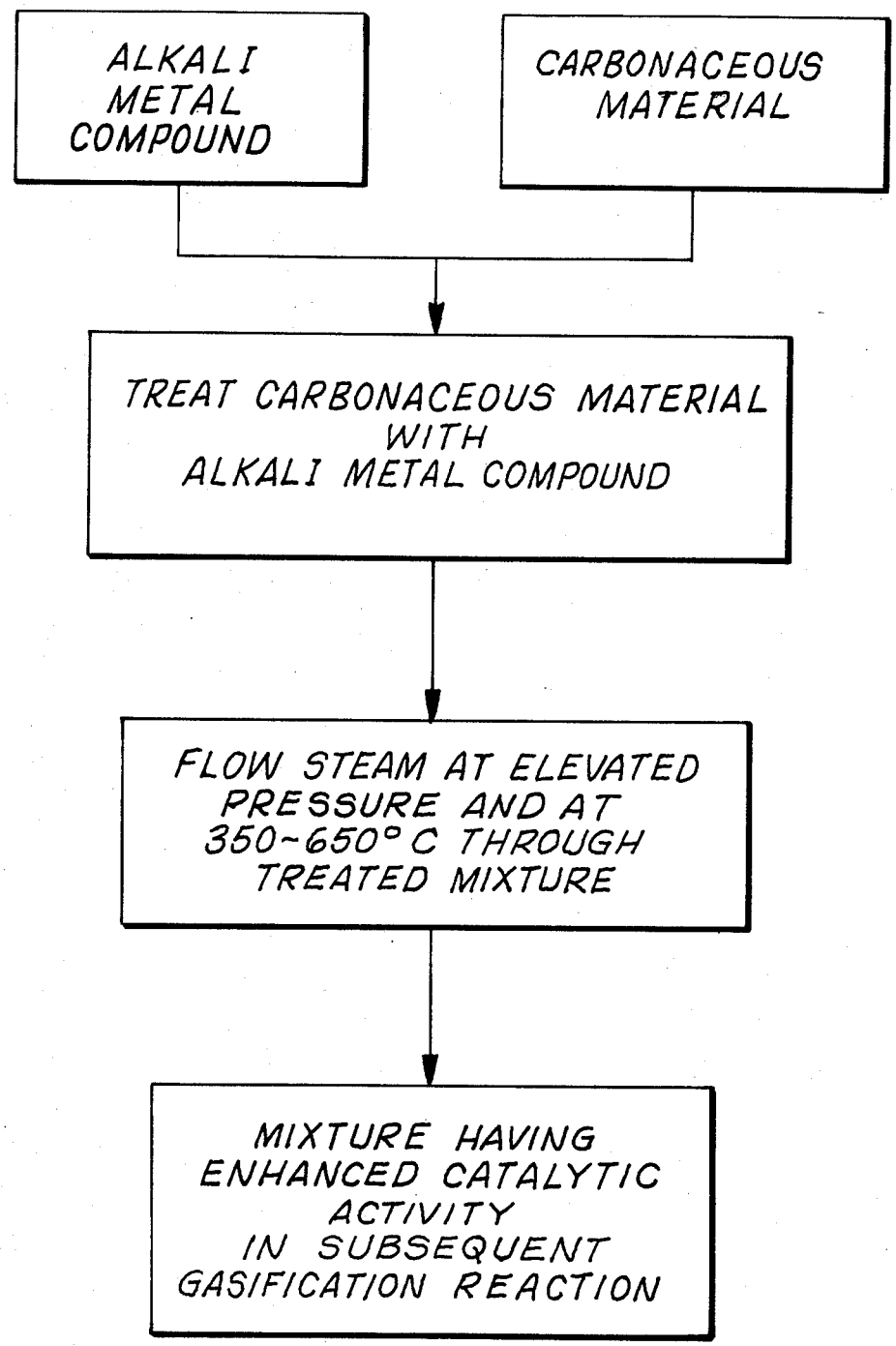

IN SITU FORMATION OF COAL GASIFICATION CATALYSTS FROM LOW COST ALKALI METAL SALTS

BACKGROUND OF THE INVENTION

1. Origin of Invention

This invention disclosure described herein was made in the course of or under Department of Energy contract DE AC21-80MC14593.

2. Technical Field of the Invention

This invention relates to coal gasification catalysts. More particularly, the invention relates to the in situ formation of a coal gasification catalyst from an alkali metal salt.

3. Background Art

The gasification of coal has become of increasing interest in recent years due to the shortage of domestic sources of other fuels, the dependence on foreign sources for such other fuels, the abundance of coal found in the United States, and environmental concerns which favor the conversion of the coal to a more environmentally acceptable fuel source. Various processes, both thermal and catalytic, are known for the gasification of coal to produce a low or medium BTU synthesis gas or a substitute natural gas (SNG).

The use of alkali metal compounds, particularly alkali metal hydroxides, as catalysts for coal conversion reactions is well known. For example, Kasehagen et al U.S. Pat. No. 2,162,221 reacted an alkali metal hydroxide, such as sodium hydroxide or potassium hydroxide, with coal to produce a coke-like product containing a lower percentage of oxygen than the original coal which may then be hydrogenated. Stambaugh et al U.S. Pat. No. 4,092,125 described a method of treating fine particles of solid carbonaceous fuel of coal- or coke-type material with a liquid aqueous solution of a sodium, potassium, or lithium hydroxide together with calcium, magnesium, or barium hydroxide or carbonate to produce a solid fuel containing a gasification catalyst which could be used as a gasification feed stock in the production of a synthetic gas. Lang U.S. Pat. No. 4,200,439 of Neavel U.S. Pat. No. 4,204,843 also recognize the use of a combination of an alkali metal compound and an alkaline earth metal compound to catalyze the gasification of coal.

Nahas et al U.S. Pat. No. 4,077,778 and Lang et al U.S. Pat. No. 4,318,712 both point out that the preferred catalyst for coal reactions, from a standpoint of catalytic activity, is potassium carbonate. Lang et al, however, further point out that while potassium carbonate is a very effective catalyst, its cost necessitates recovery and recycling. This necessity of recovering and recycling alkali metal catalysts is also pointed out by Wolfe et al U.S. Pat. No. 4,219,338 and the aforementioned Nahas U.S. Pat. No. 4,284,416. Such recovering and recycling, however, add to the number of process steps and, thus, result in additional costs which must be assessed against the gasification process.

The aforementioned Lang et al U.S. Pat. No. 4,318,712 attempts to address the cost aspects of the use of various alkali metal compounds by listing a number of alkali metal compounds considerably less expensive than the recognized effective potassium carbonate catalyst. The Lang et al approach is to use a combination of alkali metal compounds, particularly a potassium compound having a relatively poor catalytic activity in combination with a sodium or lithium salt. It is stated that the added sodium or lithium salt (such as, for example, sodium sulfate, sodium chloride, or sodium carbonate) apparently activates the relatively noncatalytic potassium compound thereby producing a substantial catalytic effect on the gasification reactions.

There remains, however, a need for an inexpensive catalyst to be used in the process for the gasification of coal.

SUMMARY OF THE INVENTION

It is, therefore, an object of the invention to provide for the in situ formation, from a mixture of carbonaceous material and an inexpensive alkali metal compound, of a catalyst suitable for use in a process for the gasification of carbonaceous material.

It is another object of the invention to provide for the production of an inexpensive catalyst for use in coal gasification by a steam treatment of an alkali metal compound after its impregnation or intimate mixture into crushed carbonaceous material.

In accordance with the invention, a carbonaceous material, such as crushed coal, is mixed with an alkali metal compound. The mixture is then transferred to a suitable reaction vessel in which it is heated in a stream of steam, a steam-oxygen mixture, a steam-air mixture, or a steam-nitrogen mixture at a temperature of 350°–650° C. whereby the carbonaceous material—alkali metal compound mixture forms a feed material for subsequent gasification having enhanced catalytic activity.

In a preferred embodiment, the alkali metal compound is sodium chloride and the steam pretreatment in the presence of the carbonaceous material enhances the catalytic activity of the mixture in a subsequent gasification reaction.

BRIEF DESCRIPTION OF THE DRAWINGS

The sole FIGURE is a flow sheet illustrating the invention.

DESCRIPTION OF THE INVENTION

The coal gasification catalyst is formed in situ by first impregnating a particulate solid carbonaceous feed material (which will be referred to herein interchangably as coal or a carbonaceous material) with an alkali metal compound. A feed material, such as bituminous coal, sub-bituminous coal, lignite, char, charcoal, coke, or biomass product, or the like, which has been crushed and screened to a particle size of about 8 mesh or smaller (U.S. Sieve series) is initially admixed or impregnated with a solution or slurry containing the alkali metal compound which is to be converted over into a more catalytically active form. This may be conveniently carried out by mixing together the crushed carbonaceous feed material with the alkali metal compound using a liquid which is a solvent for the alkali metal compound; by spraying the carbonaceous feed material with a solution containing the alkali metal compound; or by mechanically mixing the alkali metal compound with the carbonaceous material. While a number of alkali metal compounds may be used, such as the lithium, sodium, and potassium salts of halogens or sulfates, the invention finds its greatest utility in the use of an inexpensive alkali metal compound, such as an alkali metal halogen salt. Most preferably, this salt comprises sodium chloride due to the low cost of the material as well as its ready solubility in an aqueous medium for ease in impregnating the coal.

While the coal should be in particulate form for processing reasons, as will be hereinafter described, the initial treatment of the coal with the alkali metal compound may be carried out over a wide range of particle sizes (when the treatment comprises impregnation with a solution containing the alkali metal compound) due to the inherent porosity of the carbonaceous material, such as bituminous, sub-bituminous and lignite coals. The mole ratio of the alkali metal to the carbon in the treated coal should be in the range of 0.02–0.2. The coal particles should be permitted to soak in the alkali metal compound slurry for a minimum of 10 minutes up to 5 hours. Longer periods of time can, of course, be used but provide no further benefit.

The treated coal is then transferred to a reaction vessel in which it is heated in a stream containing steam to a temperature in the range of 350°–650° C. The stream of steam may comprise solely steam, a steam-oxygen mixture, a steam-air mixture, or a steam-nitrogen mixture. Other gases as well may be used, it being understood that the presence of the steam provides both the temperature for the reaction as well as a source of water for the hydrolyzing of the alkali metal compound.

While we do not wish to be bound by any particular theory of operation of the invention, it is believed that the pretreatment with steam of a carbonaceous material admixed or impregnated with an alkali metal compound results in the in situ formation of the corresponding alkali metal hydroxide or oxide. The reaction equation, when the preferred compound sodium chloride is used, then could be written in its simplest form as:

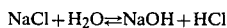

$$NaCl + H_2O \rightleftharpoons NaOH + HCl$$

However, it should be understood that such a hydrolyzed compound may be a mixture of both the hydroxide and oxide forms of the alkali metal. Thus, the use of the term hydroxide or hydrolyzed product is intended to embrace both the oxide and hydroxide forms of the alkali metal catalyst after its formation.

Because, at equilibrium, the ratio of partial pressures of HCl to $H_2O$ is less than unity, it is necessary to reduce the partial pressure of HCl to as low a value as possible while raising the partial pressure of steam to a very high value to shift the equilibrium to the right side of the reaction equation. This is accomplished by using high pressure steam, i.e., a pressure range of 2 to 300 atmospheres and utilization of flowing gas at a high space velocity to rapidly remove the HCl gas as it is formed.

The reactor may be a fixed bed, fluidized bed type of reactor or a stirred reactor. Depending upon the physical size of the reactor, the particle size, the temperature, the steam concentration or pressure, and the space velocity within the reactor, the residence time may vary from as little as 30 seconds to as much as 40 minutes. For example, at a steam flow rate of 100 liters/second (NTP) at 627° C. and 300 atmospheres pressure, equilibrium conversion of NaCl to NaOH would require about 30 minutes using a mole ratio of sodium to carbon of 0.05. Basically, the residence time must equal the minimum time needed to convert at least 25%, preferably 50%, and most preferably 90% of the alkali metal compound to the hydrolyzed form whether this be accomplished by varying particle size concentration, temperature, or reactor design. Preferably, the reactor is designed to provide a high space velocity to permit rapid removal of the hydrogen chloride gas by-product as previously discussed. This rapid removal of the hydrogen chloride, as it is formed, is desirable to drive the reaction toward a continued formation of the desired hydrolyzed product.

After removal from the reaction vessel, the activated coal-catalyst mixture may be transferred to a conventional gasifier wherein the mixture will be contacted with steam at an elevated temperature and an elevated pressure to form the desired synthetic gas. Residues from the gasifier may then be recycled back for further gasification, as is well known to those skilled in the art, or may be discarded. While such gasification and recycling form no part of the present invention, the use of a relatively inexpensive catalytic precursor, in accordance with the invention, eliminates a need, from the standpoint of economics, for recovery and recycling of the alkali metal catalyst during the gasification stages. This, of course, will greatly reduce the overall cost of the gasification reaction.

It should be noted here that the direct use in a gasification reactor of an alkali metal compound capable of hydrolysis is not an equivalent to the herein described invention because the gasification is normally carried out at higher temperature conditions than those specified for the pretreatment of the invention. Under normal gasification temperatures, for example, the rate of vaporization of sodium chloride probably exceeds the rate of hydrolysis. Thus, exposure to normal gasification conditions would largely result in depletion of the alkali metal compound rather than the desired in situ formation of the gasification catalyst by hydrolysis. However, it is within the scope of this invention that the same reactor could be used to carry out the pretreatment at a lower temperature followed by shifting to gasification conditions once the hydrolysis reaction is substantially completed.

To further illustrate the practice of the invention, samples of Illinois #6 coal char and a mineral-free channel black carbon marketed as Spheron-6 by Cabot Corporation were mixed with sodium chloride in a mole ratio of 0.03 sodium to carbon and then pretreated with a steam-oxygen mixture. For control purposes, two samples of Spheron-6 were not mixed with sodium chloride, and one of these two samples was pretreated with steam and the other was not. To provide further control, another Spheron-6 sample was mixed with sodium carbonate in a mole ratio of 0.03 sodium to carbon, and one of the Illinois No. 6 samples was not pretreated with either sodium chloride or steam. In each instance, the gasification reactivity of the sample was subsequently evaluated in a temperature programmed reactor in a stream of 3 volume % steam in helium with an on-line mass spectrometer and using a temperature rise of one degree Centigrade per second. The observed gasification rates as reflected by the rate of appearance of $CO + H_2$ are shown in Table 1. The gasification rate shown in Table 1 is in $10^{-4}$ seconds$^{-1}$. The pretreatment conditions used (where steam is shown in the table) were: 94 volume % steam; 6 volume % oxygen; pressure 1 atmosphere; space velocity $10^4$ seconds$^{-1}$; duration of 7 kiloseconds; and temperature of 610° C.

TABLE 1

| Carbon Phase | Pretreatment | Specific Gasification Rate | |
| --- | --- | --- | --- |
| | | 700° C. | 827° C. |
| Spheron-6 | none | 0.05 | — |
| Spheron-6 | steam | 0.46 | 0.95 |
| Spheron-6 + NaCl | none | 0.54 | 2.2 |
| Spheron-6 + NaCl | steam | 1.2 | 3.6 |
| Spheron-6 + $Na_2CO_3$ | none | 12. | 37. |
| Illinois No. 6 char | none | 0.08 | 0.53 |
| Illinois No. 6 char + NaCl | steam | 1.9 | 10.5 |

It will be seen that, for the case of the Spheron-6 sample admixed with sodium chloride and pretreated with steam, the subsequent gasification rate at 750° C. is more than double that of an untreated sample. The Illinois No. 6 coal sample shows an even larger change of rate between treated and untreated samples.

Thus, the invention provides a means for forming a catalyst in situ from an inexpensive precursor which need not be recovered and recycled, therefore, greatly reducing the overall cost and complexity of the gasification process.

What is claimed is:

1. A process for the in situ formation of a gasification catalyst in a carbonaceous material which comprises:
   (a) mixing an alkali metal halide with said carbonaceous material;
   (b) thereafter treating said mixture in a stream containing steam at a temperature of 350° to 650° C. for a sufficient time period to hydrolyze at least 25 mole% of said alkali metal to form a hydrolyzed product in the substantial absence of any gasification to enhance the catalytic activity of the resultant mixture in subsequent gasification of said mixture;
   (c) utilizing high pressure steam at a high space velocity to remove the HCl gas as it is formed in said hydrolysis reaction; and
   (d) passing the resultant gasification catalyst product to a gasification zone.

2. The process of claim 1 wherein said carbonaceous material is in particulate form.

3. The process of claim 2 wherein said carbonaceous material is selected from the class consisting of coal, coke, carbon, char, charcoal, and biomass.

4. The process of claim 2 wherein said alkali metal compound is mixed with said particulate carbonaceous material in a slurry.

5. The process of claim 2 wherein said alkali metal halide is dissolved in a liquid and said particulate carbonaceous material is then soaked in said liquid to treat said carbonaceous material with said alkali metal halide.

6. The process of claim 5 wherein said carbonaceous material is soaked in said liquid for at least 10 minutes.

7. The process of claim 5 wherein said alkali metal halide solution is sprayed on said carbonaceous material.

8. The process of claim 2 wherein said metal halide is in particulate form and said alkali metal halide and said particulate carbonaceous material are mixed together to form a particulate mixture.

9. The process of claim 1 wherein the pressure of said steam is from 2 to 300 atmospheres.

10. The process of claim 1 wherein the mole ratio of alkali metal to carbon is from 0.02 to 0.2.

11. The process of claim 2 wherein said stream containing steam comprises one or more gases selected from the class consisting of steam, a steam-oxygen mixture, a steam-air mixture, and a steam-nitrogen mixture.

12. The process of claim 1 wherein said alkali metal halide comprises a halogen salt of sodium and said hydrolyzed product is selected from the class consisting of sodium hydroxide, sodium oxide, and mixtures thereof.

13. A process for the in situ formation of a gasification catalyst in a carbonaceous material which comprises:
   (a) pretreating a particulate carbonaceous material having a particle size of 8 mesh or smaller with sodium chloride in a mole ratio of from 0.02 to 0.2 sodium to carbon;
   (b) exposing said sodium chloride-carbonaceous mixture to a stream containing steam at a temperature of from 350° to 650° C., a pressure of from 2 to 300 atmospheres, and for a time period sufficient to hydrolyze at least 25 mole% of said sodium in the substantial absence of any gasification to thereby form in situ the corresponding alkali metal hydroxide or oxide catalyst having enhanced catalytic activity; and
   (c) passing the resultant gasification catalyst product to a gasification zone.

14. The process of claim 12 wherein said halogen salt of sodium comprises sodium chloride.

15. A process for the production of an inexpensive gasification catalyst for the production of gases from carbonaceous materials which comprises:
   (a) impregnating a porous particulate carbonaceous material having a particle size of 8 mesh or less with a solution containing sodium chloride in a mole ratio of from 0.02 to 0.2 sodium to carbon;
   (b) reacting said mixture with steam at a temperature of from 350° to 650° C., a pressure of from 2 to 300 atmospheres, and for a time period sufficient to hydrolyze at least 25 mole% of said sodium in the substantial absence of any gasification;
   (c) removing hydrogen chloride gas from said mixture as it is formed; and
   (d) passing the resultant gasification catalyst product to a gasification zone.

* * * * *